(12) United States Patent
Anastasijevic et al.

(10) Patent No.: US 9,764,300 B2
(45) Date of Patent: Sep. 19, 2017

(54) PROCESS AND PLANT FOR REFINING RAW MATERIALS CONTAINING ORGANIC CONSTITUENTS

(71) Applicant: OUTOTEC OYJ, Espoo (FI)

(72) Inventors: Nikola Anastasijevic, Altenstadt (DE); Michael Missalla, Oberursel (DE); Guenter Schneider, Lorsch (DE); Andreas Orth, Friedrichsdorf (DE)

(73) Assignee: OUTOTEC OYJ, Espoo (FI)

( * ) Notice: Subject to any disclaimer, the term of this patent is extended or adjusted under 35 U.S.C. 154(b) by 45 days.

(21) Appl. No.: 14/564,183

(22) Filed: Dec. 9, 2014

(65) Prior Publication Data

US 2015/0093296 A1    Apr. 2, 2015

Related U.S. Application Data

(62) Division of application No. 12/867,451, filed as application No. PCT/EP2009/000729 on Feb. 4, 2009, now Pat. No. 8,936,657.

(30) Foreign Application Priority Data

Feb. 13, 2008    (DE) .................. 10 2008 008 943

(51) Int. Cl.
*B01J 7/00* (2006.01)
*B01J 8/18* (2006.01)
*C10G 1/02* (2006.01)

(52) U.S. Cl.
CPC .............. *B01J 8/1818* (2013.01); *C10G 1/02* (2013.01); *B01J 2208/00752* (2013.01)

(58) Field of Classification Search
CPC combination set(s) only.
See application file for complete search history.

(56) References Cited

U.S. PATENT DOCUMENTS 3,093,571 A    6/1963    Fish et al.
3,874,739 A *  4/1975    Mitchell .............. B01J 8/0025
                                                          252/372

(Continued)

FOREIGN PATENT DOCUMENTS

EP           1015527 B1    7/2000
JP        2001241611 A     9/2001

(Continued)

OTHER PUBLICATIONS

Nicolas P. Cheremisinoff, "Handbook of Air Pollution and Control", pp. 26-27, Aug. 14, 2002.

(Continued)

*Primary Examiner* — Imran Akram
(74) *Attorney, Agent, or Firm* — Leydig, Voit & Mayer, Ltd.

(57) ABSTRACT

A plant for refining raw materials containing organic constituents includes a reactor configured to receive raw materials; a furnace configured to receive solids and fuel from the reactor; a return conduit configured to recirculate hot solids generated in the furnace to the reactor; and a sealing device configured to separate an oxidizing atmosphere of the furnace from an atmosphere of the reactor. The sealing device includes: a downpipe disposed between the furnace and the reactor, the downpipe being configured to withdraw a stream of solids from the furnace; a rising pipe disposed near a bottom of the downpipe and branching off there from to a top, the rising pipe being configured to transport a fluidized stream of solids to the reactor; and a conveying gas supply disposed below the rising pipe, the conveying gas supply being configured to fluidize a stream of solids withdrawn from the furnace.

8 Claims, 2 Drawing Sheets

(56) References Cited

U.S. PATENT DOCUMENTS

| | | | |
|---|---|---|---|
| 4,157,245 A | 6/1979 | Mitchell et al. | |
| 4,461,629 A * | 7/1984 | Arisaki | B01D 46/38 |
| | | | 122/7 R |
| 4,507,195 A | 3/1985 | Spars et al. | |
| 4,947,803 A * | 8/1990 | Zenz | F23C 10/02 |
| | | | 110/245 |
| 5,033,413 A * | 7/1991 | Zenz | F23C 10/02 |
| | | | 110/245 |
| 5,104,519 A * | 4/1992 | Haddad | C10G 11/182 |
| | | | 208/113 |
| 5,426,868 A * | 6/1995 | Yamada | B01J 8/388 |
| | | | 34/282 |
| 5,513,599 A | 5/1996 | Nagato et al. | |
| 5,536,488 A | 7/1996 | Mansour et al. | |
| 5,580,241 A * | 12/1996 | Koeberle | B01J 8/1845 |
| | | | 432/100 |
| 6,149,765 A | 11/2000 | Mansour et al. | |
| 7,135,151 B1 | 11/2006 | Palmas | |
| 2005/0118076 A1 | 6/2005 | Lomas | |
| 2006/0076269 A1 * | 4/2006 | Lomas | B01J 8/0055 |
| | | | 208/113 |
| 2006/0076275 A1 | 4/2006 | Smith | |
| 2006/0231459 A1 | 10/2006 | Swan, III et al. | |
| 2008/0202985 A1 | 8/2008 | Hatfield et al. | |
| 2009/0118559 A1 | 5/2009 | Stamires et al. | |
| 2010/0024297 A1 * | 2/2010 | Suda | C10J 3/482 |
| | | | 48/61 |
| 2010/0187161 A1 | 7/2010 | Anastasijevic et al. | |

FOREIGN PATENT DOCUMENTS

| | | |
|---|---|---|
| WO | WO 2006131506 A1 | 12/2006 |
| WO | WO 2008113553 A1 | 9/2008 |
| WO | WO 2009010157 A2 | 1/2009 |

OTHER PUBLICATIONS

Honda et al., Fluidized Bed Incinerator Operation Involves Separating Bed Material from Exhaust Gas, Separating Bed Material and Ash, and Returning Bed Material to Furnace and Ash to Solid and Gas Splitter Side, WPI / Thomson, Sep. 7, 2001, vol. 2001, Nr:73, XP002560560.

International Search Report for PCT/EP2009/000729 mailed on Jan. 13, 2010.

Vego et al., Utilization of Spent Oil Shale in a Fluidized Bed Proccess, XP002560564, obtained online at http://www.ani.gov/PCS/acsfuel/preprint%20archive/Files/38_3_3_CHICAGO_08-93_0972.pdf.

* cited by examiner

PROCESS AND PLANT FOR REFINING RAW MATERIALS CONTAINING ORGANIC CONSTITUENTS

CROSS REFERENCE TO PRIOR APPLICATIONS

This application is a division of U.S. application Ser. No. 12/867,451, filed on Aug. 12, 2010, which is a U.S. National Phase application under 35 U.S.C. §371 of International Application No. PCT/EP2009/000729, filed on Feb. 4, 2009 and which claims benefit to German Patent Application No. 10 2008 008 943.5, filed on Feb. 13, 2008. The International Application was published in English on Aug. 20, 2009 as WO 2009/100840 A2 under PCT Article 21(2).

FIELD

The present invention relates to a process and to a plant for refining raw materials containing organic constituents, such as solids containing oil, bitumen and/or kerogen, and in particular oil, tar sand or oil shale.

BACKGROUND

In view of an increasing shortage of petroleum deposits, the economic exploitation of raw materials containing organic constituents, such as oil, tar sands or oil shale, has become of greater interest. Oil or tar sands are mixtures of clay, sand, water and hydrocarbons. The latter can have different compositions and range from bitumen to normal crude oil. The hydrocarbon content in the sands is between about 1 and 18%. The economic efficiency of exploitation increases with the hydrocarbon content. Oil or tar sands can be recovered by surface mining. When extracting them from deeper soil layers, an initial processing of the oil or tar sand is already effected in situ. Steam is introduced into the deposit in order to liquefy the hydrocarbons. This kind of oil recovery therefore requires a great deal of water, which cannot be discharged entirely free from oil.

Oil shales are rocks which contain bitumen or low-volatility oils. The content of organic matter (kerogen) lies between about 10 and 30%. Oil shales are not shales in a petrographic sense, but layered, not schistous, sedimentary rocks. The recovery of hydrocarbons, such as oil from oil shale, is traditionally effected by mining and subsequent pyrolysis (carbonization at 500° C.). Subsurface recovery (in situ) is alternatively used by pressing a steam-air mixture into the rock previously loosened by blasting and ignition of a flame front, which expels the hydrocarbons such as oil.

The previous recovery of hydrocarbons, such as crude oil from oil or tar sands or oil shale is thus relatively cost-intensive. With rising oil prices, the recovery of hydrocarbons, such as crude oil, from oil or tar sands and oil shale becomes increasingly interesting in economic terms. A problem in the present recovery of hydrocarbons, such as crude oil, from oil or tar sands and oil shales is the necessary high consumption of water and the emission of waste waters containing residual oil.

U.S. Pat. No. 4,507,195 describes a process for coking contaminated oil shale or tar sand oil on solids distilled in retorts. The hydrocarbonaceous solids are mixed with a hot heat transfer material in order to raise the temperature of the solids to a temperature suitable for the pyrolysis of the hydrocarbons. The mixture is maintained in a pyrolysis zone until a sufficient amount of hydrocarbon vapours is released. In the pyrolysis zone, a stripping gas is passed through the mixture in order to lower the dew point of the resulting hydrocarbon vapours and entrain the fine particles. Accordingly, a mixture of contaminated hydrocarbon vapours, stripping gas and entrained fine particles is obtained from the pyrolysis zone. From the contaminated hydrocarbon vapours, a heavy fraction is separated and thermally cracked in a fluidized bed consisting of the fine particles, whereby the impurities together with coke are deposited on the fine particles in the fluidized bed. The product oil vapours are withdrawn from the coking container. As heat transfer material, recirculated solids residues from pyrolyzed oil shale or tar sand is used, which was guided through a combustion zone, in order to burn remaining carbon and provide the heat for the pyrolysis of the raw material. Since there is no pressure seal between the combustion zone and the pyrolysis furnace, the oxidizing atmosphere of the combustion zone can enter the pyrolysis furnace and impair the quality of the oil vapour. Thermal cracking in the coking container also consumes a great deal of energy and is therefore expensive.

EP 1 015 527 B1 describes a process for the thermal treatment of feedstock containing volatile, combustible constituents, wherein the feedstock is mixed with hot granular solids from a collecting bin in a pyrolysis reactor in which relatively high temperatures exist. This should lead to cracking reactions in the gases and vapours in the reactor.

Besides the thermal cracking used in the above-mentioned processes, catalytic cracking processes are also known. In Fluid Catalytic Cracking (FCC), the heavy distillate of a refinery is decomposed to gases, liquefied gases and gasolines, for example, to long-chain n-alkanes and i-alkanes. Cracking is generally effected at temperatures between 450 and 550° C. and a reactor pressure of 1.4 bar by means of an alumosilicate-based zeolite catalyst. FCC crackers are described for instance in U.S. Pat. No. 7,135,151 B1, US 2005/0118076 A1 or US 2006/0231459 A1. An exemplary catalyst is disclosed in WO 2006/131506 A1.

Further possibilities for the further treatment of hydrocarbon fractions include hydrotreatment and hydrocracking.

SUMMARY

An aspect of the present invention is to provide a more efficient process for utilizing the organic constituents of raw materials, such as materials containing oil and/or bitumen, and in particular oil, tar sand or oil shale.

In an embodiment, the present invention provides a plant for refining raw materials containing organic constituents. The plant includes a reactor configured to receive raw materials; a furnace configured to receive solids and fuel from the reactor; a return conduit configured to recirculate hot solids generated in the furnace to the reactor; and a sealing device configured to separate an oxidizing atmosphere of the furnace from an atmosphere of the reactor. The sealing device includes: a downpipe disposed between the furnace and the reactor, the downpipe being configured to withdraw a stream of solids from the furnace; a rising pipe disposed near a bottom of the downpipe and branching off there from to a top, the rising pipe being configured to transport a fluidized stream of solids to the reactor; and a conveying gas supply disposed below the rising pipe, the conveying gas supply being configured to fluidize a stream of solids withdrawn from the furnace.

BRIEF DESCRIPTION OF THE DRAWINGS

The present invention is described in greater detail below on the basis of embodiments and of the drawings in which.

DETAILED DESCRIPTION

Figure 1:
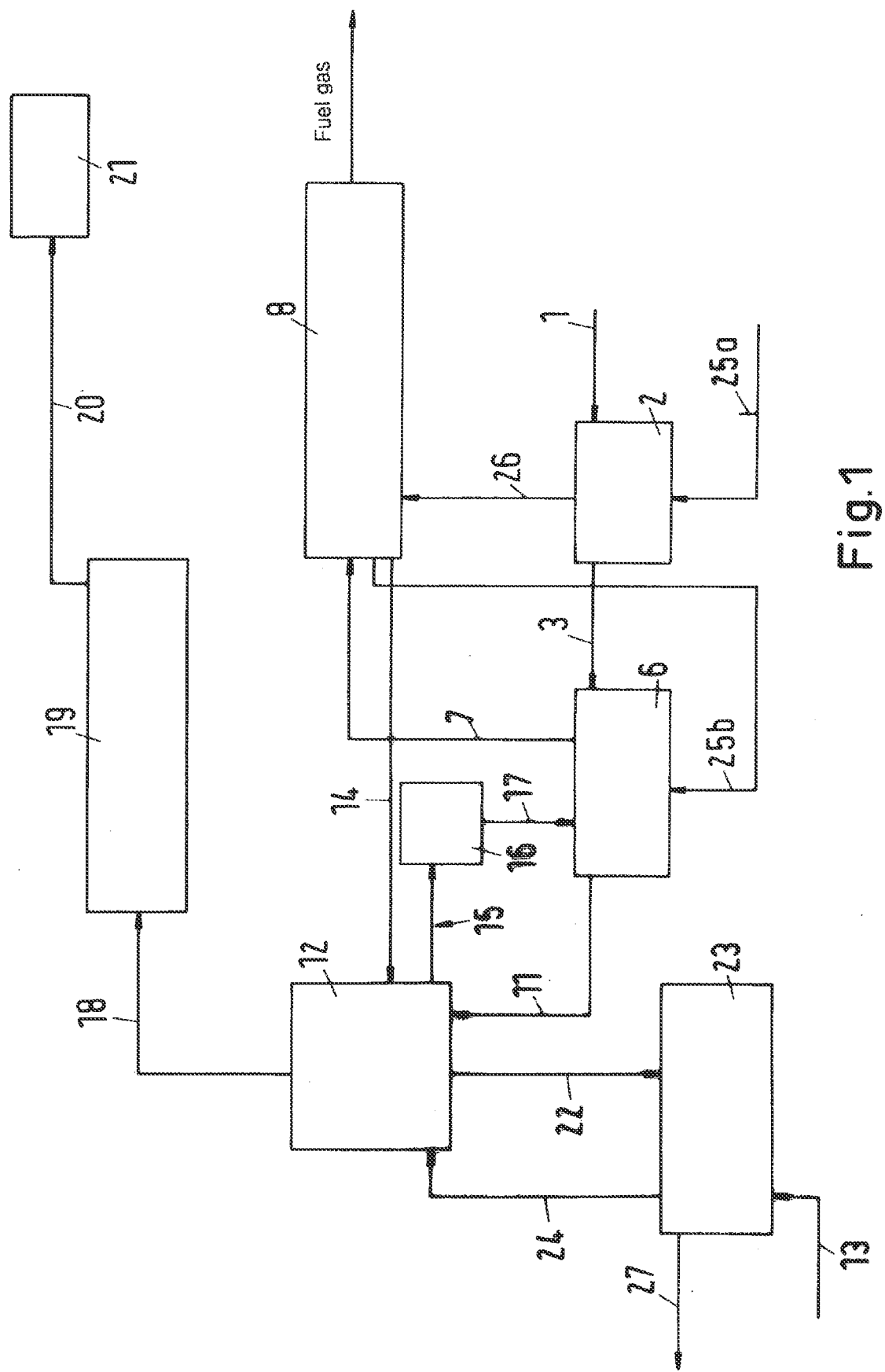
FIG. 1 schematically shows an exemplary plant for performing a process in accordance with the present invention.

In the reactor, the hydrocarbons contained in the raw materials can volatilize as fuel gas, for example, for 60% to 80% or for 65% to 70%, at a temperature of, for example, 400 to 790° C., and, upon gas cleaning, be used, for instance, in metallurgical processes such as the reduction of iron-containing ores, calcination processes such as gold ore and the like, as calciners such as $Al_2O_3$, alum earth, gypsum, loam and the like, or in pelletizing plants. The remaining amount of hydrocarbons left in the solids can be burnt in a furnace configured as heat generator in order to provide the heat required in the reactor, which is transferred into the reactor via the solids withdrawn from the furnace. Between the furnace and the reactor, a seal is provided in order to separate the oxidizing atmosphere of the furnace from the distillation section of the reactor and to avoid an oxidation, combustion or even explosion of the fuel gases generated in the reactor. In an embodiment of the present invention, the raw materials are dried and/or preheated in a one or multi-stage process before being introduced into the reactor. Drying can be effected at a temperature of about 80 to 120° C., and preheating at a temperature of about 110 to 300° C. With a rather low loss of organic constituents, the water content should largely be removed from the raw materials, wherein the ultralight hydrocarbons contained in the raw material are separated, for instance, by distillation, and are supplied as product to the fuel gas originating from the reactor. The water can be supplied to a sewage treatment plant. Preheating serves the purpose of minimizing the mass flow which is recirculated from the furnace into the reactor as heat transfer medium. As a result, the possible thermal energy to be supplied to the reactor is also reduced or a corresponding suspension preheater. A fluidized bed with a heat transfer medium can be used as a preheater, or the heat can also be transferred indirectly.

The reactor serves, for example, to expel the organic constituent by distillation contained in the dried and/or preheated raw material as fuel gas. For optimizing the heat transfer of the solids fed into the reactor a circulating fluidized bed, a stationary fluidized bed, an annular fluidized bed or a transport or flash reactor can, for instance, be used.

In a succeeding step, the fuel gas obtained can be processed to a uniform or different quality and/or condition, for example, by desulfurization or cracking.

In the present invention, fluidizing the reactor is effected with gas streams which are obtained from the drier/preheater and/or the reactor itself and contain light hydrocarbons, for example, an amount of the fuel gas originating from the reactor. It is, however, also possible to supply nitrogen, hydrogen, carbon dioxide gas mixtures containing air or oxygen, or an amount of the waste gas from the furnace to the reactor as fluidizing gas. A portion of air or oxygen in the gas mixture can be used for adjusting or initiating a partial combustion for adapting the temperature and/or the yield. It is also possible to perform the fluidization by means of an inert gas such as nitrogen. The fluidizing gases can be supplied to the reactor cold or preheated.

In an embodiment of the present invention, it is possible to divide the reactor for expelling the hydrocarbons into several individual reactors in order to more accurately adjust defined temperatures and gas compositions.

To raise efficiency, the reactor can be operated under a reduced pressure in the range from 0.001 to 1 bar (abs.). Lowering the pressure promotes the expulsion of the fuel gas from the solids and reduces the risk of dropping below the dew point.

To improve or control the yield in the reactor, for example, electromagnetic waves such as microwaves, ultrasound or the like can be used. It is likewise possible to use catalytically active substances in the reactor, which can improve and control or regulate the evaporation of the organic constituents in the reactor or control and change their composition.

The furnace serves to generate heat for the reactor, wherein the temperature of, for instance, 300 to 800° C., which is required in the reactor, is introduced into the reactor via the solids heated in the furnace. In accordance with an embodiment of the present invention, the combustion in the furnace can be performed in an atmosphere with an excess of oxygen, which can be produced by supplying air, air enriched with oxygen or pure oxygen, so as to obtain a nearly complete combustion of the organic constituents left in the solids, for example, of the heavy oil components or oil products. The oxygen containing gases can be supplied cold or preheated, so that the furnace temperature lies, for example, between 700 and 900° C.

In accordance with the present invention, a circulating fluidized bed, an annular fluidized bed, a stationary fluidized bed, a transport or flash reactor, a rotary kiln or a grate combustion can be used as furnace. To increase the utilization of energy, a staged combustion can, for example, be used. Additional fuel can be supplied to the furnace, for example, in the form of untreated raw material, coal, coke, waste materials, biomass or the like, or an amount of the fuel gas obtained in the reactor.

In a staged combustion, at least one stage can, for example, be performed as a substoichiometric combustion (i.e., with a lack of oxygen) and at least one stage as a superstoichiometric combustion (i.e., with an excess of oxygen).

In a staged combustion, it is also possible to combine part of or the entire waste gas from a substoichiometric combustion stage with the fuel gas from the reactor or to use it separately in another plant, such as a metallurgical plant, or in another part of the plant such as the reactor or preheating. The yield of gas and/or the gas quality from the generation of fuel gas can thereby be changed and regulated or controlled.

The temperature in the furnace can be adjusted so that an optimum temperature to expel fuel gas is achieved in the reactor. At higher temperatures, less solids containing organic constituents are delivered from the reactor into the furnace so that additional fuel might be required. The optimum is determined by means of the properties of the raw material used.

It is also possible to introduce waste gas from the furnace or from the downstream plant in which the fuel gas is required (for example, the metallurgical plant), into the furnace in order to operate the furnace or regulate or control the temperature.

To improve the energy balance, the heat generated in the furnace can be recovered from the waste gas and/or the calcination residue in accordance with the development of the present invention. This can be effected by means of a heat recovery system, for instance in the form of a fluidized-bed cooler/heater, a heat recovery cyclone, a waste heat boiler or a suspension preheater (Venturi/cyclone) combination. It is also possible to use the heat generated in the furnace for preheating the fluidizing streams of the drier/preheater and/or reactor or for indirectly heating the drier/preheater. The heat can also be utilized for steam generation, for example, for further power generation.

This present invention also extends to a plant for refining raw materials containing organic constituents, such as solids containing oil and/or bitumen, in particular oil, tar sand or oil shale, but also oil-containing fluidizable materials or wastes, comprising a reactor to which the raw materials are supplied, a furnace to which solids and fuel coming from the reactor are supplied, a return conduit via which hot solids generated in the furnace are recirculated to the reactor, and a blocking means for separating the gas atmospheres of the furnace and of the reactor, which can be a fluidized-bed reactor.

In accordance with an embodiment of the present invention, the plant also can include a drier/preheater for drying/preheating the raw materials introduced.

The furnace can be a fluidized-bed furnace, a rotary kiln or a flash reactor.

Downstream of the furnace, a circulating fluidized bed, a heat recovery system for the waste gas and/or the calcination residue can, for example, be provided.

Gas cleaning units or gas processing stages can also be provided for the gases generated (waste gas and fuel gas).

In an embodiment of the present invention, the blocking device between the furnace and the reactor includes a downpipe via which a stream of solids is withdrawn from the furnace, a riser pipe which close to the bottom of the downpipe is branched off from the same to the top, and a conveying gas supply below the riser pipe, wherein the stream of solids withdrawn from the furnace is fluidized by the conveying gas and transported to the reactor via the riser pipe. This not only regulates the mass flow of heat transfer medium supplied to the reactor, which can be controlled via the supply of the conveying gas, but also provides for a reliable pressure seal between the oxidizing atmosphere of the furnace and the reactor. An oxidation, combustion or even explosion of the fuel gases expelled in the reactor thus can reliably be avoided. Apart from the so-called seal pot construction described above, a lock hopper, a check valve or combinations of these elements can also be used.

A plant for refining raw materials containing organic constituents, which is schematically shown in FIG. 1, includes a one- or multistage drier/preheater 2, to which raw materials, such as oil or tar sand or oil shale, are supplied via a supply conduit 1. With a temperature of, for instance, 200° C., the dried/preheated solids are supplied to a reactor 6 suitable for distillation, in which the same are heated to 500 to 750° C., and thereby the organic constituents are expelled as fuel gas. Upon passing through a cleaning and/or processing 8, the fuel gases obtained are discharged for further use.

The solids left in the reactor 6 after expelling the fuel gases, which contain amounts of heavy hydrocarbons, are supplied via a conduit 11 to a furnace 12 configured, for example, as a circulating fluidized-bed furnace, to which, for example, air and an amount of the fuel gas originating from the reactor 6 can be supplied via conduits 13, 14 for starting the furnace 12 or for controlling the same.

Figure 2:
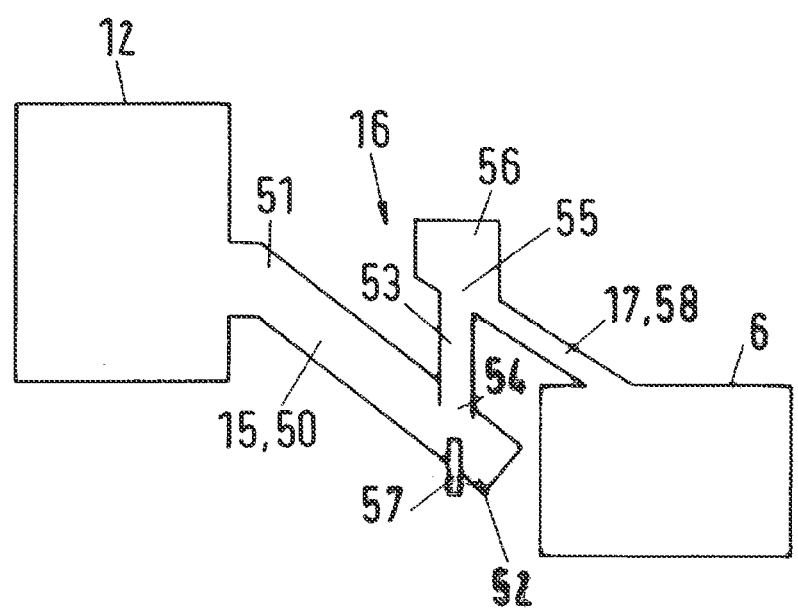
FIG. 2 schematically shows a possible blocking device arranged between the furnace and the reactor.

From the furnace 12, a return conduit 15 leads to a sealing device 16 shown in detail in FIG. 2, which is used for separating the furnace and reactor atmospheres and is connected with the reactor 6 via a conduit 17.

The waste gas from the furnace 12 is supplied via a conduit 18 to a heat recovery 19 and then via a conduit 20 to a gas cleaning 21. Via a conduit 22, the calcination residue of the furnace 12 also can be supplied to a heat recovery 23. Via a conduit 24, the heated gas obtained in the heat recoveries 19, 23 (for example, air or other mixtures with oxygen) can be introduced into the furnace 6 as oxidizing agent.

It is possible to energetically couple the cleaning and processing stage 8 with the heat recovery 19, in order to achieve a maximum energy integration or energy utilization.

In FIG. 2, a so-called seal pot is shown as an example for a suitable sealing device 16. From the furnace 12, the descending return conduit 15 is branched off, which is also referred to as downpipe 50 or downer and via which hot solids are discharged as heat transfer media for the reactor 6. The inlet region of the downpipe 50 also is referred to as head 51 of the downpipe. Just before the bottom 52 of the downpipe 50, an upwardly directed conduit, which also is referred to as rising pipe 53 or riser, is branched off from the downpipe 50 and substantially extends against gravity. The diameter of the downpipe 50 is greater than that of the rising pipe 53, for example, about twice as great as that of the rising pipe 53. The inlet region or foot 54 of the rising pipe 53 can slightly protrude into the downpipe 50 or terminate flush with the wall of the downpipe. At the upper end or head 55 of the rising pipe 53, the rising pipe opens into a discharge pot 56, from which the solids can flow off into the reactor 6 via the conduit 17. At the bottom 52 of the downpipe 50, below the foot 54 of the rising pipe, conveying gas is supplied via a nozzle 57 connected to the supply conduit 58, in order to fluidize the stream of solids in the rising pipe 53. As fluidizing gas, every suitable conveying gas can in principle be used. For example, a third inert gas, such as nitrogen, can be used to separate the gas atmospheres between the fluidized bed in the furnace 12 and the head of the rising pipe 53.

The plant for refining raw materials containing organic constituents (hydrocarbons) in accordance with the present invention can be substantially constructed as described above. In the following, its mode of operation, function and action will be explained in greater detail.

The ground or unground, for example, oil-containing raw materials, supplied via the supply conduit 1 are heated to a temperature of 105 to 160° C. and dried in the drier/preheater 2, for instance, by means of fluidizing gas supplied via a fluidizing conduit 25a, and preheated to about 450° C. Via a discharge conduit 26, a gas stream containing superlight oil components is supplied to a gas cleaning and processing 8. In the reactor 6, the preheated solids are heated to a temperature of for instance 650 to 700° C. by means of the hot solids recirculated from the furnace 12, whereby 61 to 75 wt-% of the hydrocarbons contained in the solids are expelled as fuel gas. Via conduit 7, the fuel gases obtained are supplied to the gas processing 8 and, upon cleaning, discharged as fuel gas for further use with a temperature of for instance about 200 to 300° C. An amount of the fuel gas and of the light hydrocarbon components originating from the drier/preheater 2 can be recirculated to the reactor 6 via a fluidizing conduit 25b.

Via conduit 11, the solids left in the reactor including the non-evaporated heavy hydrocarbon components are introduced into the furnace 12 and burnt there at a temperature of for instance about 850° C. There are merely burnt the hydrocarbons still contained in the solids, and the solids thereby are brought to a high temperature, so that they can serve as heat transfer media for the reactor 6.

The calcination residue, which via conduit 22 is delivered to the heat recovery 23, is discharged to the outside via a discharge conduit 27.

The present invention is not limited to embodiments described herein; reference should be had to the appended claims.

LIST OF REFERENCE NUMERALS 1 supply conduit for solids
2 drier/preheater
3 conduit for dried/preheated solids
6 reactor for solids
7 conduit for fuel gas
8 cleaning/processing for fuel gas
11 conduit for solids
12 furnace (heat generator)
13 conduit for combustion gas
14 conduit for fuel gas
15 return conduit for solids
16 blocking device (seal pot)
17 conduit for solids
18 conduit for waste gas
19 heat recovery for waste gas
20 conduit for waste gas
21 gas cleaning for waste gas
22 conduit for calcination residue
23 heat recovery for calcination residue
24 conduit for combustion gas
25a fluidizing conduit (e.g. air, waste gas)
25b fluidizing conduit (fuel gas)
26 discharge conduit for fuel gas
27 discharge conduit for calcination residue
50 downpipe
51 head of the downpipe
52 bottom of the downpipe
53 riser pipe
54 foot of the riser pipe
55 head of the riser pipe
56 discharge pot
57 nozzle
58 supply conduit

The invention claimed is:

1. A plant for refining raw materials containing organic constituents, the plant comprising:
a reactor configured to receive raw materials;
a furnace configured to receive solids and fuel from the reactor;
a sealing device configured to separate an oxidizing atmosphere of the furnace from an atmosphere of the reactor, the sealing device including:
a downpipe disposed between the furnace and the reactor, the downpipe being configured to withdraw a stream of solids from the furnace,
a rising pipe disposed near a bottom of the downpipe and branching off therefrom to a top, the rising pipe opening at the top into a discharge pot from which the solids are flowable into the reactor, and
an inert gas supply disposed below the rising pipe, the Inert gas supply being configured to supply an inert gas to fluidize the stream of solids withdrawn from the furnace and to transport the fluidized stream of solids up the rising pipe to the discharge pot such that the oxidizing atmosphere of the furnace is separated from the atmosphere of the reactor
wherein a diameter of the downpipe is greater than a diameter of the rising pipe.

2. The plant as recited in claim 1, wherein the reactor is a fluidized-bed reactor.

3. The plant as recited in claim 1, further comprising at least one of a drier and a preheater disposed upstream of the reactor.

4. The plant as recited in claim 1, wherein the furnace includes at least one of a circulating fluidized-bed furnace, a fluidized bed reactor, a rotary kiln and a flash reactor.

5. The plant as recited in claim 1, further comprising a heat recovery system disposed downstream of the furnace.

6. The plant as recited in claim 1, wherein organic constituents include at least one of oil and bitumen.

7. The plant as recited in claim 1, wherein the downpipe descends in a downward direction from an outlet of the furnace and the rising pipe branches off from the downpipe in an upward direction against gravity to the discharge pot at the top of the rising pipe, the inert gas supply being disposed directly below a bottom of the rising pipe.

8. The plant as recited in claim 1, wherein the diameter of the downpipe is about twice as large as the diameter of the rising pipe.

* * * * *